W. DE SILVA.
STREET CAR LIFE SAVING DEVICE.
APPLICATION FILED JULY 13, 1908.
934,509.
Patented Sept. 21, 1909.
4 SHEETS—SHEET 1.
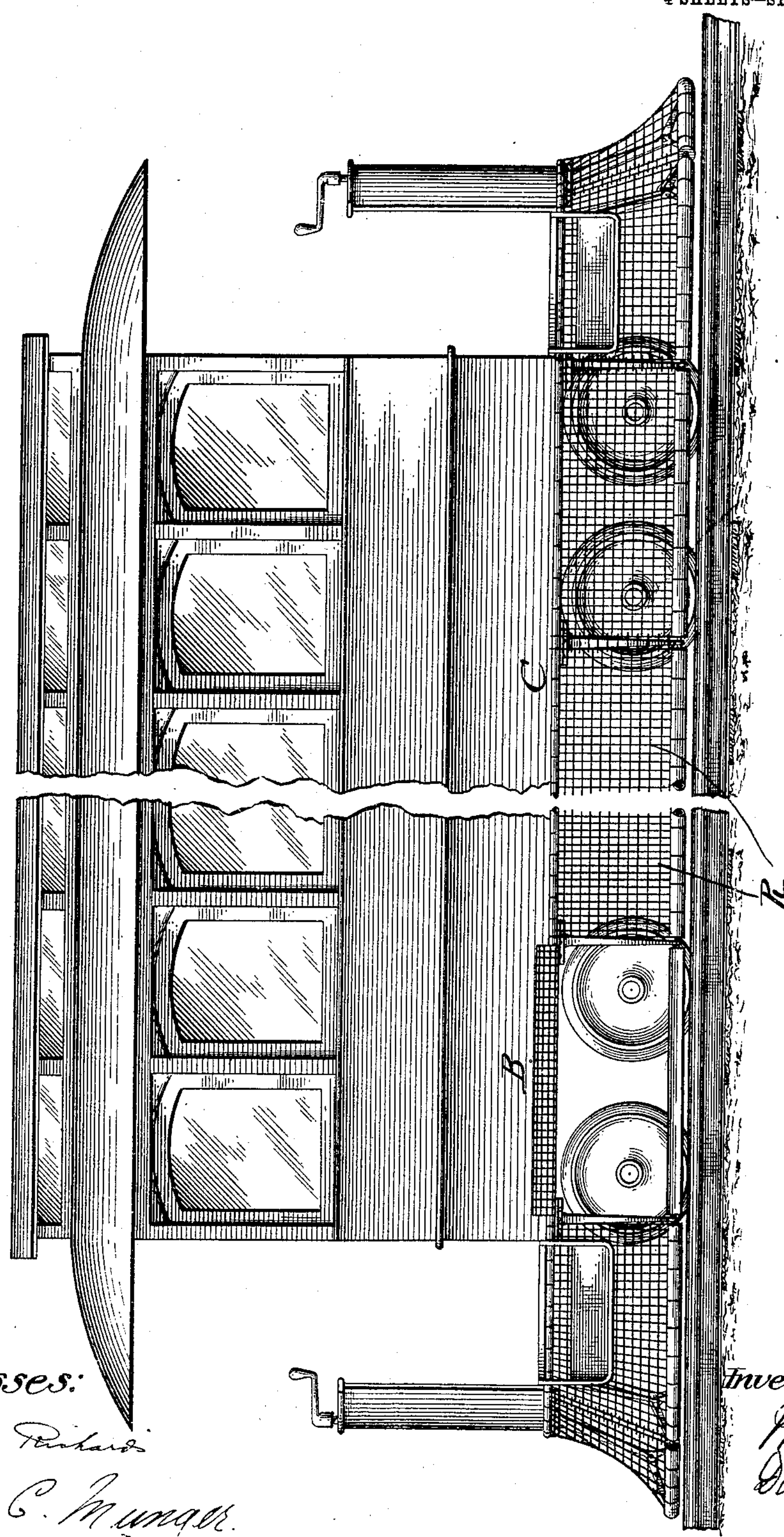
ANDREW. B. GRAHAM CO., PHOTO-LITHOGRAPHERS, WASHINGTON, D. C.

W. DE SILVA.
STREET CAR LIFE SAVING DEVICE.
APPLICATION FILED JULY 13, 1908.
934,509. Patented Sept. 21, 1909.
4 SHEETS—SHEET 2.
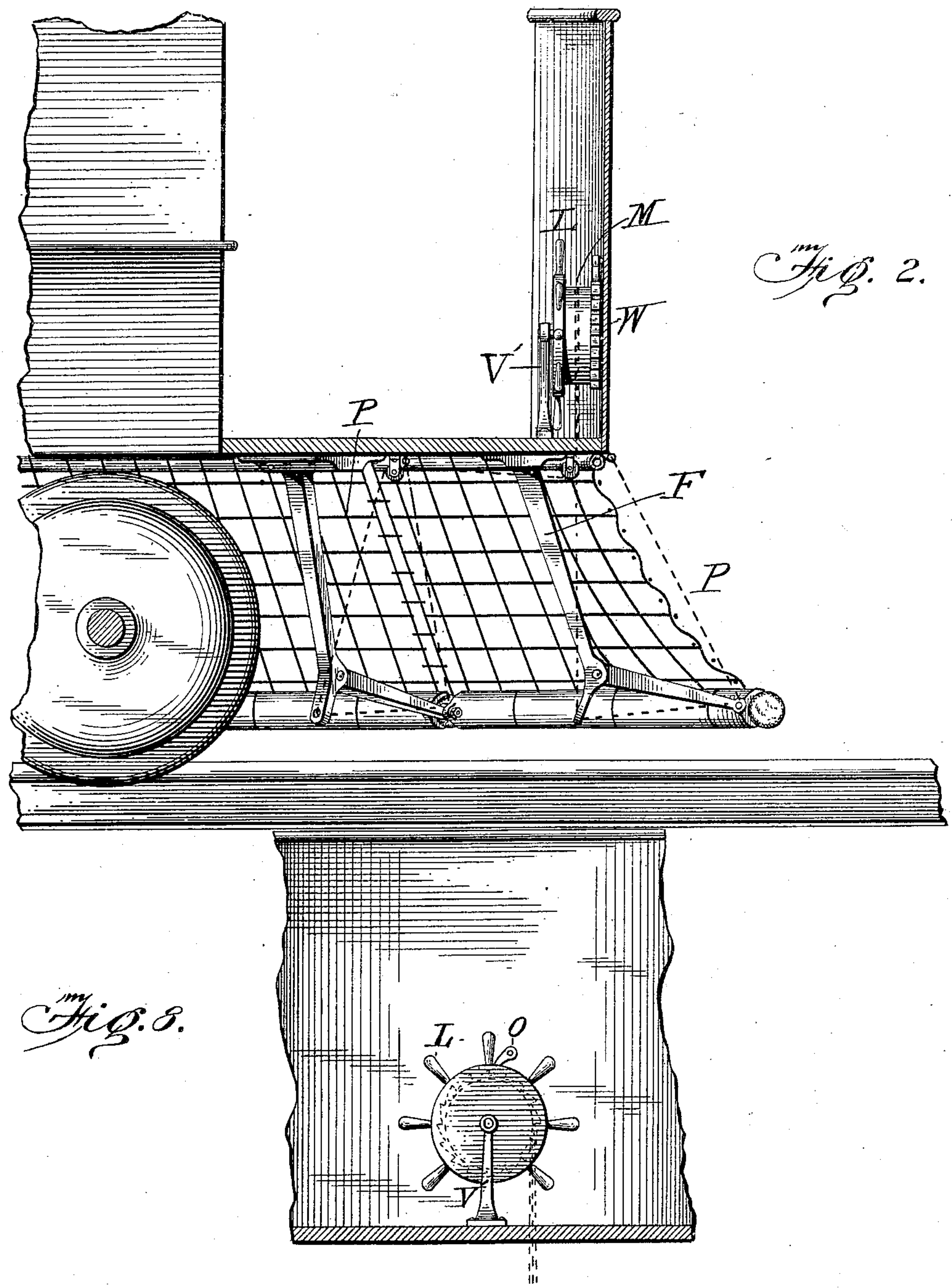
Witnesses:
William Richards
Ralph C. Munger
Inventor:
William DeSilva
ANDREW. B. GRAHAM CO., PHOTO-LITHOGRAPHERS, WASHINGTON, D. C.

W. DE SILVA.
STREET CAR LIFE SAVING DEVICE.
APPLICATION FILED JULY 13, 1908.
934,509.
Patented Sept. 21, 1909.
4 SHEETS—SHEET 3.
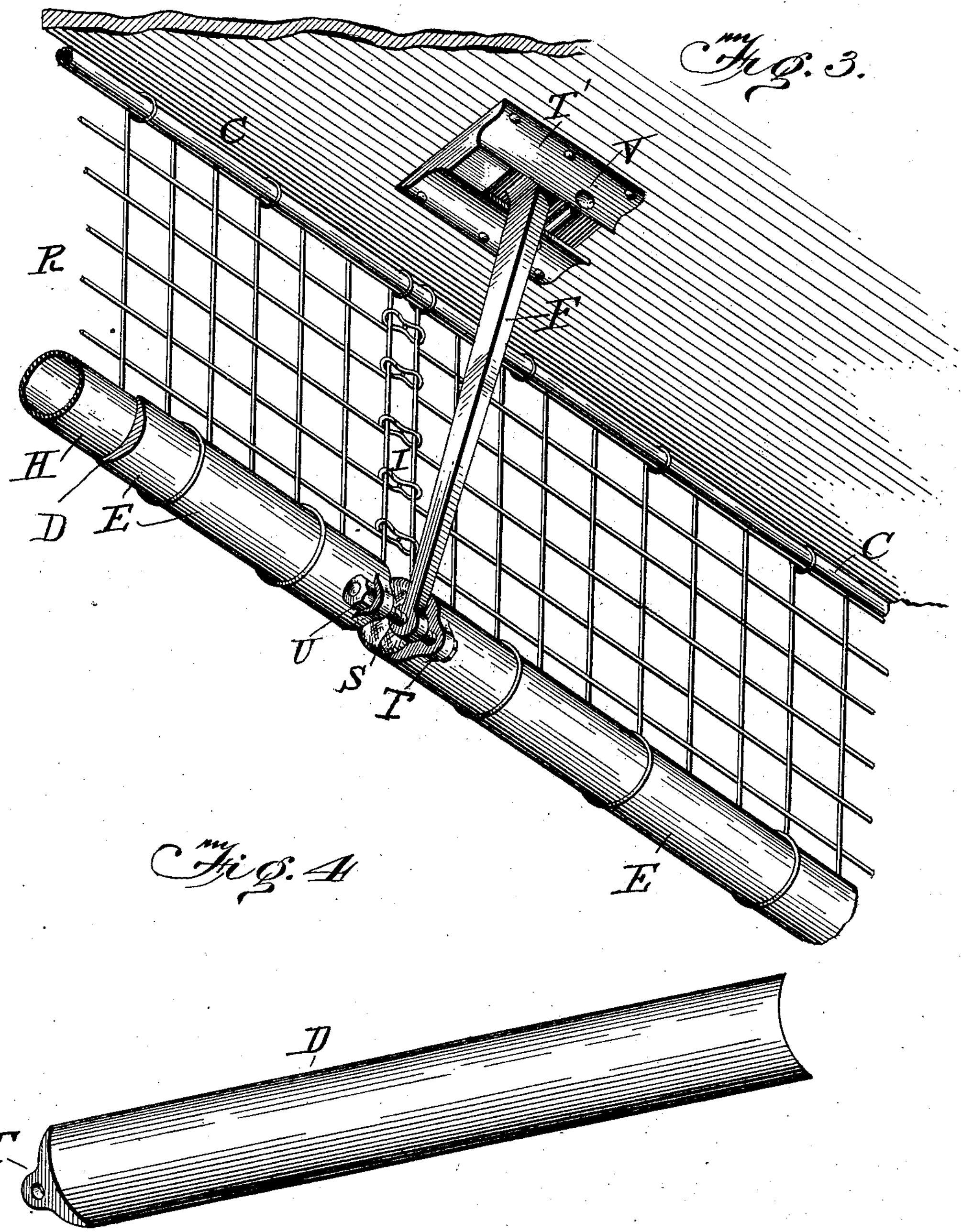
Witnesses:
William Richards
Ralph C. Mauger
Inventor:
William DeSilva
ANDREW. B. GRAHAM CO., PHOTO-LITHOGRAPHERS, WASHINGTON, D. C.

W. DE SILVA.
STREET CAR LIFE SAVING DEVICE.
APPLICATION FILED JULY 13, 1908.
934,509.
Patented Sept. 21, 1909.
4 SHEETS—SHEET 4.
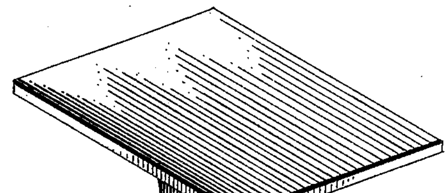
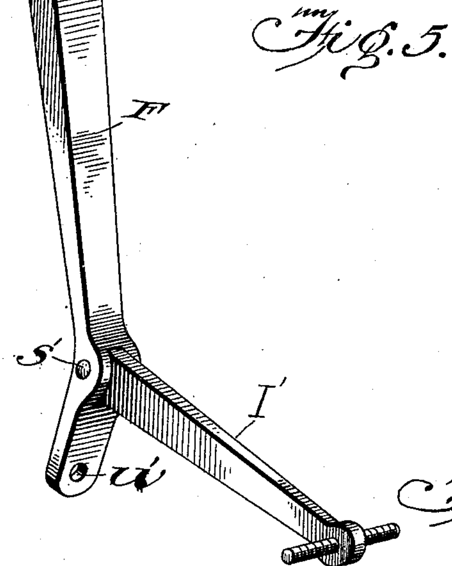
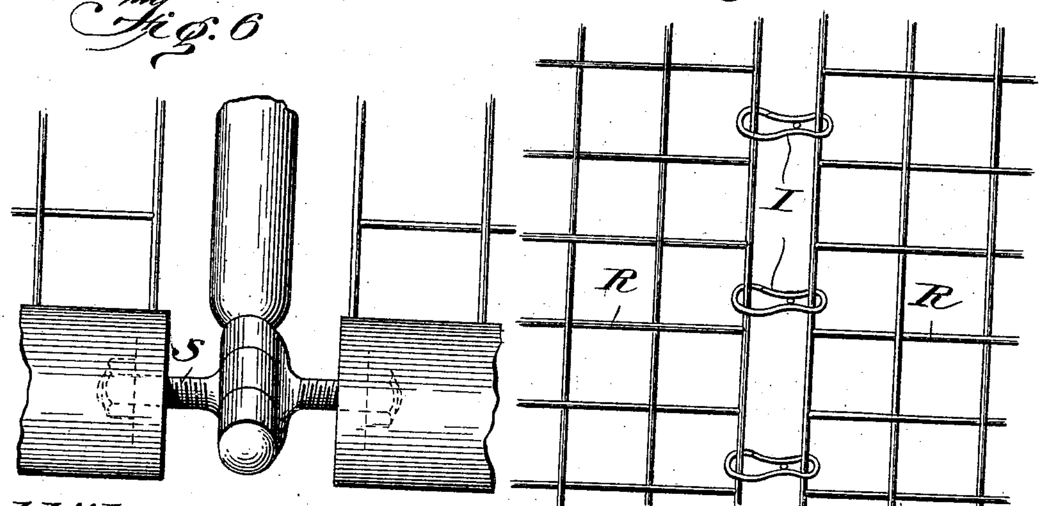
Witnesses:
William Richards
Ralph C. Munger.
Inventor:
William DeSilva
ANDREW. B. GRAHAM CO., PHOTO-LITHOGRAPHERS, WASHINGTON, D. C.

UNITED STATES PATENT OFFICE.

WILLIAM DE SILVA, OF VANCOUVER, BRITISH COLUMBIA, CANADA.

STREET-CAR LIFE-SAVING DEVICE.

934,509. Specification of Letters Patent. Patented Sept. 21, 1909.

Application filed July 13, 1908. Serial No. 443,400½.

*To all whom it may concern:*

Be it known that I, WILLIAM DE SILVA, of the city of Vancouver, Province of British Columbia, Dominion of Canada, master mariner, having invented certain new and useful Improvements in Street-Car Life-Saving Devices, do hereby declare that the following is a full, clear, and exact description of the same.

My invention relates to improvements in electric or other street car life saving apparatus, and the objects of my improvements are, 1, to provide an absolute protection all around the car, covering all accessible dangers; 2, a feature is a twelve inch iron wheel, similar to ship's steering wheel, with spokes, a drum, and cogs, attached for the raising and lowering of the front fender by the foot of the motorman; 3, to afford facilities independent of each other in sections that can be detached and rolled up so that access can be easily had to the wheels or other parts of the working and running gear, if necessary, the sections being constructed of wire netting and steel springs, protected with rubber air or steam hose fenders that are connected together through the socket brackets at the ends of the springs by the screw bolts at the ends of the arms, said sections forming one continuous fender.

Figure 1 is an elevation of the apparatus attached to the car, extending all around with a section rolled up showing how access can be had to the wheels or other working parts of the car when necessary. Fig. 2 is an elevation partly in section of the front part of the apparatus, showing its connections and the lifting and lowering ends of the jointed arms, that are operated by the endless chain, passing up through the floor by leads over the drum wheel that raises and lowers the fender. Fig. 3 is a perspective view of parts of the apparatus, showing the arm placed in the stationary socket bracket underneath the car, with fenders and netting attached. Fig. 4 shows a section of the steel spring. Fig. 5 shows the jointed arm for the ends of the car, the lower end of which can be raised and lowered. Fig. 6 shows the hinged screws entered through the socket brackets on the spring plates. Fig. 7 shows netting sections joined together with spring hooks. Fig. 8 shows spoke wheel with pawl for raising and lowering the front fenders.

Similar letters refer to similar parts throughout the several views.

The iron rod "C" (see Figs. 1 and 3) extends entirely around the car, and the netting sections "R" are attached to this rod "C" and hang from the arms "F" that are held in the sockets T—. The sections T— are fastened underneath the car, and permit the netting sections "R" to yield when said sections come in contact with an obstacle.

"B" is a netting and spring section rolled up, "D" is a detached section of the spring fender showing socket "T."

"E" is the spring fender viewed from the rear, showing the screw belt, "S" passing through the socket "T" and fastened with the nut "U."

"F" is an arm placed in the socket bracket "T" fastened with the nut "U."

"H" is a rubber fender fastened on the spring "D."

"I. I" are spring hooks (Fig. 7) joining netting sections "R. R" together where they meet.

"J" (Fig. 5) is a jointed arm connected and worked on a pin, "S." This is for the front ends of the car, for raising and lowering the front fenders, which is accomplished by a wire rope or chain "P" (see Fig. 2) which is attached to the lifting end of the arm, passing up through the floor by apertures with turns over the drum "M" that is worked by the foot of the motorman on the spokes "L. L" while the cog wheel "N" is adjusted on the trip pawl as required, the chain "P" passing underneath the arm through the lead. "U" answers as a stay to keep it from otherwise rising. I prefer carrying out this feature of my invention in the manner shown in Fig. 2 when it will be seen that the iron pillar "Q" fastened in a stationary manner to the floor of the car supports the wheel at the spoke end while the other end is supported and turns in a lug "W" fastened inside to the front end of the car.

The fender will minimize the force of impact, pick up or push aside any object coming in contact with it.

I am aware that prior to my invention, street car life saving devices have been made, but What I do claim as my invention and desire to secure by Letters Patent is:

1. The combination in the street car life saving apparatus of a detachable and attachable steel spring, a rubber hose protected fender which yields and rebounds when struck, minimizing the force of the blow, fender elements made in sections attached and detached at will separately, adapted to be rolled up to get at the running gear when necessary, and adapted to form a continuous protection around the car, when connected.

2. The combination in a street car life saving apparatus comprising a jointed arm and endless chain, a drum wheel and moveable front fenders connected therewith, all substantially as set forth.

Signed at Vancouver, British Columbia, this thirteenth day of February, A. D. 1908.

WILLIAM DE SILVA.

In presence of—
H. C. H. Cornish,
A. E. Galpin.